Jan. 16, 1934.　　　J. E. PADGETT　　　1,943,694
CONTROL MECHANISM FOR MOTOR VEHICLES
Filed March 23, 1932　　　4 Sheets-Sheet 1
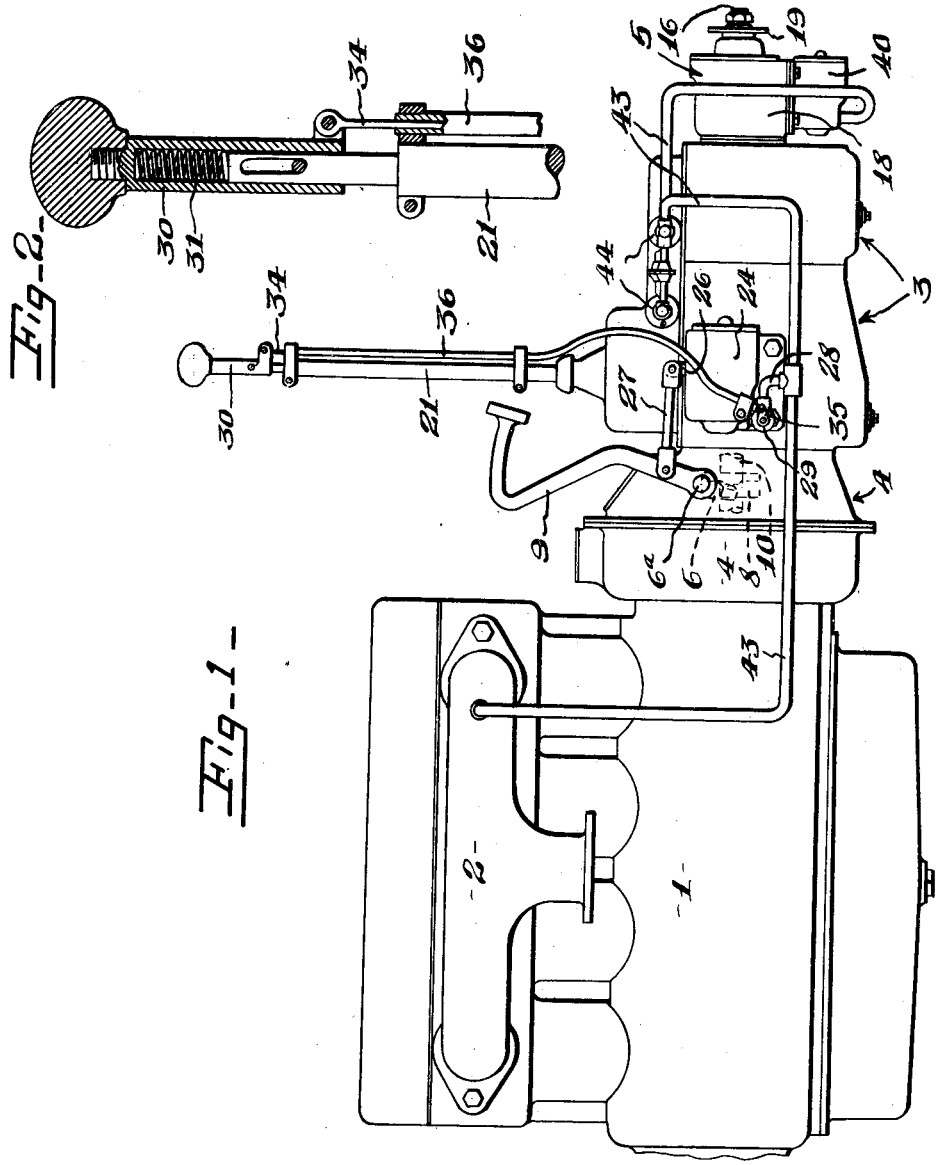
INVENTOR.
Joseph E. Padgett
BY Budell & Thompson
ATTORNEYS.

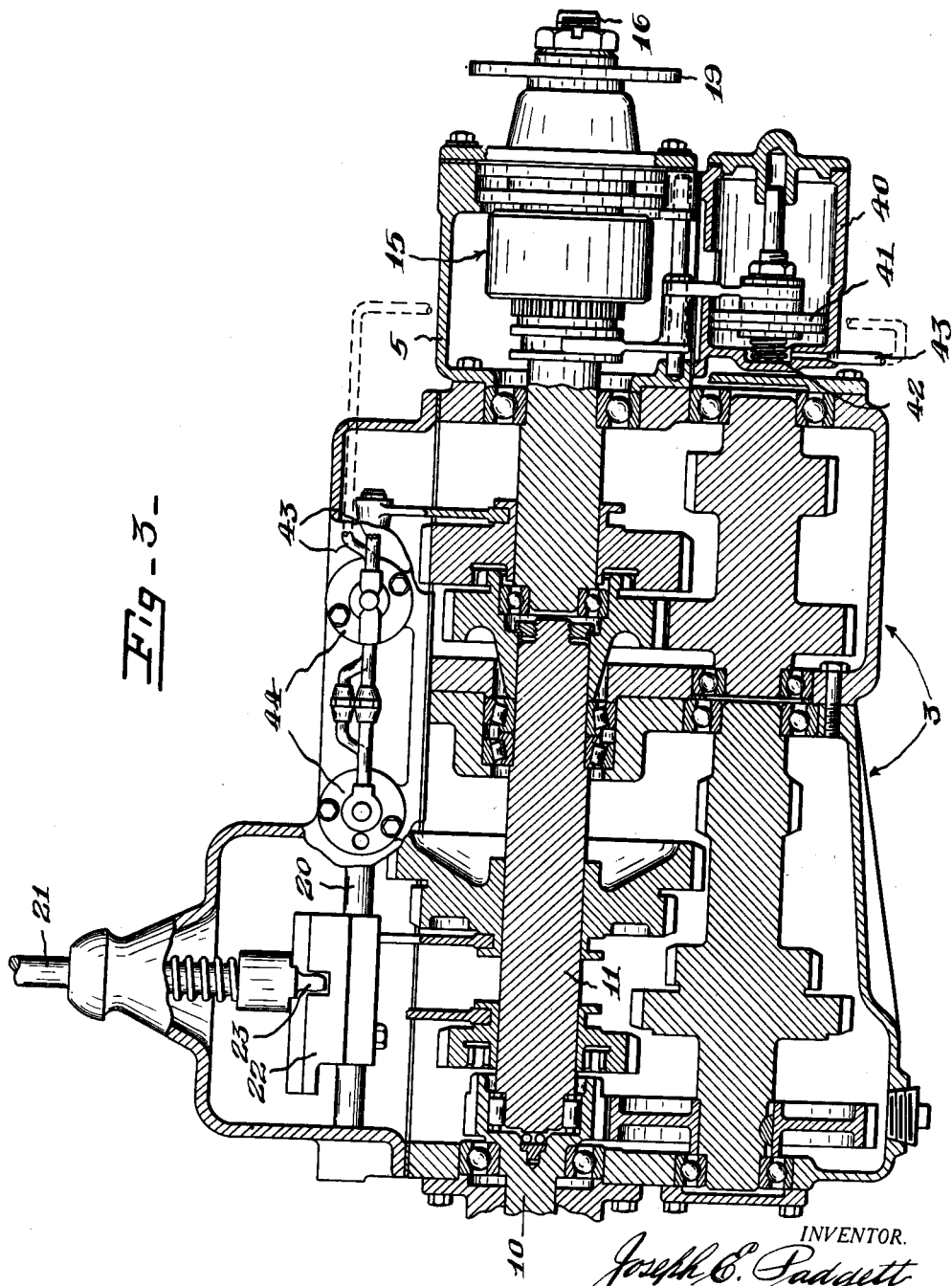

Jan. 16, 1934.                    J. E. PADGETT                    1,943,694
                    CONTROL MECHANISM FOR MOTOR VEHICLES
                         Filed March 23, 1932            4 Sheets-Sheet 3

INVENTOR.
Joseph E. Padgett
BY Bodell & Thompson
ATTORNEYS.

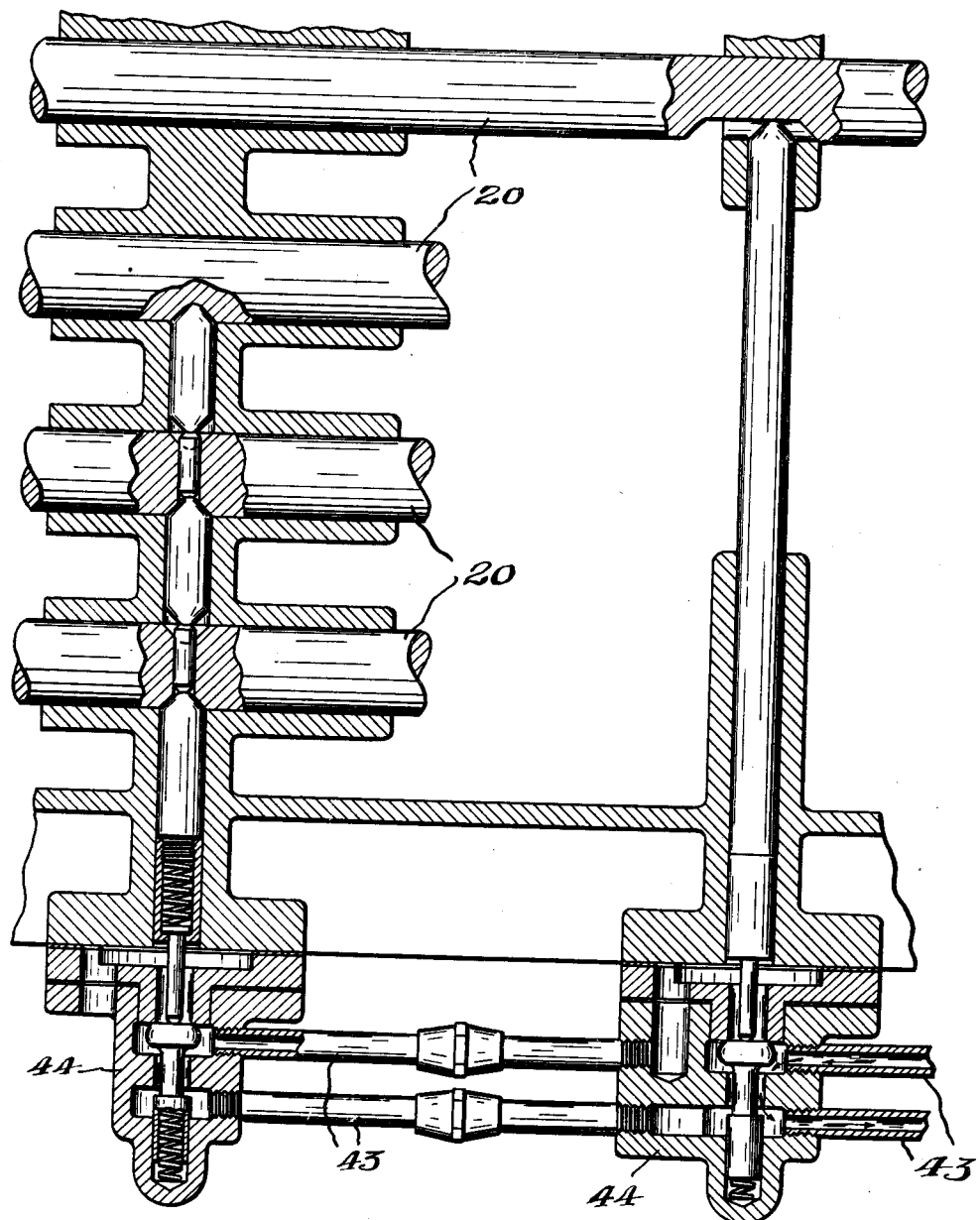

Patented Jan. 16, 1934

1,943,694

UNITED STATES PATENT OFFICE 1,943,694

CONTROL MECHANISM FOR MOTOR VEHICLES

Joseph E. Padgett, Toledo, Ohio, assignor to Spicer Manufacturing Corporation, Toledo, Ohio, a corporation of Virginia Application March 23, 1932. Serial No. 600,677

4 Claims. (Cl. 74—58)

This invention relates to control means for motor vehicles, and has for its object, a particularly simple and efficient control mechanism for correlating the throwing out of the main clutch preliminary to gear shifting operations, and the effecting of the throwing out of the rear clutch by the gear shifting operation by power controlled by the gear shifting lever.

The invention consists in the novel features and in the combinations and constructions hereinafter set forth and claimed.

In describing this invention, reference is had to the accompanying drawings in which like characters designate corresponding parts in all the views.

Figure 1 is a side elevation of a power plant of a motor vehicle provided with this invention.

Figure 2 is a detailed view of a portion of the throw-out mechanism for the main clutch.

Figure 3 is a longitudinal, sectional view of the change speed gearing assembled as a unit with the internal combustion engine of the vehicle, showing a rear clutch and the operating mechanism therefor.

Figure 5 is a fragmentary plan view of part of the shifting mechanism of the change speed gearing showing the control of the flow of power to the operating mechanism for the rear clutch upon the operation of the gear shifting lever.

Figure 4:
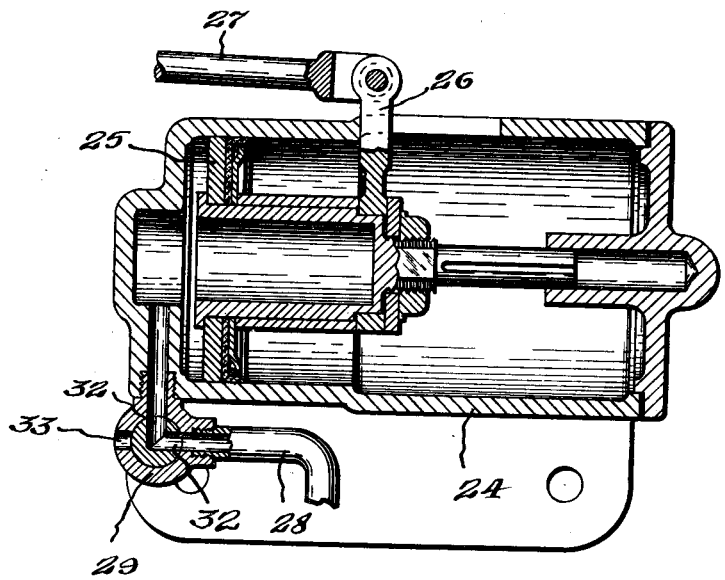
Figure 4 is a detailed view of one of the motors for throwing out one of the clutches.
Figure 6:
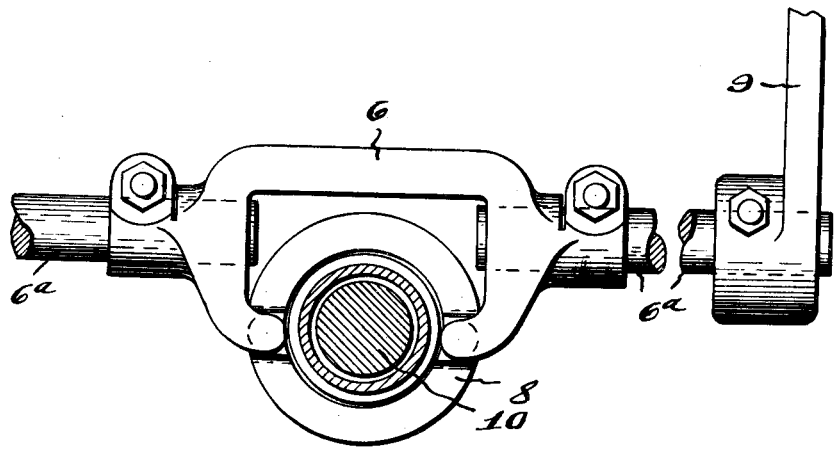
Figure 6 is a fragmentary detail view of the yoke and throw-out mechanism for the main clutch.

1 designates the internal combustion engine having the usual intake manifold 2.

3 designates generally, the change speed gearing assembled as a unit to the internal combustion engine.

4 designates the main clutch housing, and 5 the rear clutch housing.

The main clutch may be of any suitable form, size, and construction, and is operated by a throw-out mechanism against the action of the usual clutch spring. The throw-out mechanism includes a yoke 6 having shafts, or studs 6ª, journalled in the clutch housing 4 and coacting in the usual manner with the throw-out collar 8, and the usual clutch pedal 9 mounted on one of the shafts 6ª outside of the clutch housing.

The transmission gearing may be of any suitable form, size, and construction, and includes the usual drive shaft 10, transmission shaft 11, and countershaft, gears between the same including shiftable elements operable to produce direct drive, and a plurality of forward reduced speeds, and one reverse, in the usual manner.

15 designates the rear clutch mounted on a shaft 16 in line with the transmission shaft, this clutch being normally engaged and operable to disengage the shaft 16 from the transmission shaft during gear shifting operations, so that during the gear shifting operations with the main clutch thrown out, and the rear clutch thrown out, the gears of the gearing are idle, and the shifting readily effected. The shaft 16 and its throw-out mechanism are located in a suitable housing 5 at the rear end of the gear box, and the shaft 16 is connected in any well known manner to the propeller shaft of the vehicle, usually through a universal joint, one section of which is designated 19.

The shifting of the shiftable gears is effected by the usual shift rods 20 having blocks as 22 coacting with a finger 23 at the lower end of the shifting lever 21, which has a lateral selective movement, and a fore and aft shifting movement. The selecting operation, as is well known, can only take place when all the shift rods are in neutral position.

This invention relates to power means for operating the throw-out mechanisms for the main and rear clutches, and controls for the power means, the power means for the main clutch being controlled by an operating member carried by the gear shifting lever in position to be grasped by the operator when the lever is taken hold of for the purpose of shifting gears, and the power mechanism for the rear clutch being controlled by the movement of the gear shifting lever toward neutral position.

The power means for the throw-out mechanisms of the clutches are preferably fluid operated motors, and are also preferably operated by vacuum.

The source of vacuum is, in the illustrated embodiment of my invention, the intake manifold of the internal combustion engine. The motor for the throw-out mechanism of the main clutch consists of a suitable casing, as a cylinder 24, and a movable member therein, as a piston 25, the rod of which is connected by a fork 26 and link 27 to a lever arm on the yoke 6. It is here shown as connected directly to the clutch pedal 9.

The casing, or cylinder, 24 is connected to a source of power by a conduit 28 having a normally closed valve 29 therein, and the valve is operated by an operating member 30 at the upper end of the gear shifting lever, this member being connected to the valve by motion transmitting connections, so that upon operation of the operating member 30, the valve 29 will be opened, and upon release of said member 30, the valve 29 will be closed by a suitable returning spring 31. The valve here shown is a two-way rotary valve having passages 32 so arranged that the cylinder is normally open to the outer air through a port 33, and the supply, or vacuum, pipe 28 closed, and upon operation of the valve by the operating member, the port 33 is closed, and the conduit 28 opened, so that the piston is subject to the vacuum created in the manifold. The connections between the operating member and the valve are here shown as a push rod, or wire 34, extending along the lever and connected at one end to the operating member 30, and at its other end to an arm 35 on the valve 29. When the valve is closed and hence, the cylinder 24 opened to the outer air, the clutch spring, in re-engaging the clutch and hence, moving the throw-out mechanism or yoke, also returns the piston 25 to its starting position. Thus at any time it is desired to throw out the main clutch, the operating member, or push button, can be depressed, so that the main clutch is thrown out by power. The wire 34 is guided in a suitable casing or tube 36.

The throw-out mechanism for the rear clutch is operated by a similar cylinder and piston 40, 41, except that the piston is acted upon directly by a returning spring 42. The cylinder is connected to a source of power, as the intake manifold, through conduits 43 having valve means 44 therein arranged to be opened by the movement of the gear shifting lever from a shifted position toward neutral, this valve means being operated by the movement of any one of the shift rods.

The mechanism for operating the valves by the shift rods per se, forms no part of this invention, but forms the subject matter of my pending application, Sr. No. 582,812, filed December 23, 1931, and insofar as this invention is concerned, it is sufficient to bear in mind that the movement of any one shift rod toward neutral position opens up the conduit to the cylinder of the motor for the rear throw-out mechanism so that the rear clutch is thrown out upon the initial movement of the shift rod toward neutral position, and is again closed upon the movement of the shift rod from neutral position into a shifted position. Obviously, the operator can throw out the main clutch with the foot pedal in the usual manner, or by depressing the operating member or handle 30 at the upper end of the gear shifting lever.

In operation, assuming a gear shift is to be made, the operator grasps the handle 30 of the gear shifting lever, and at the same time depresses it thus, through the connection 34, opening the valve 29, so that the vacuum created in the manifold actuates the piston 25 to the left, Figure 4, to throw out the main clutch, which will be held out as long as the handle 30 is held depressed. At the same time, assuming that the gear shifting lever is in neutral, the valve means for the conduit of the cylinder for the throw-out mechanism of the rear clutch is open, and the rear clutch is out and hence, upon movement of the gear shifting lever from neutral, the selected gears will be engaged, and the valve means automatically closed, the operator then releasing the gear shifting lever, so that the main clutch is again reengaged. To make an additional shift, the handle 30 is depressed, as before, thus throwing out the main clutch, and upon the initial movement of the gear shifting lever toward neutral position, one of the valves of the valve means 44 of the conduit 43 to the cylinder 40 of the rear clutch will be opened, so that the rear clutch 15 will be thrown out while the gear shifting lever is moving toward neutral position. Also, by this invention, the so-called free wheeling can be effected by throwing out the main clutch by depressing and holding depressed the push button. If desired, a suitable latch may be provided for holding the handle 30 depressed for free wheeling purposes, and this latch released when the free wheeling is to be discontinued.

What I claim is:

1. The combination with the main clutch throw-out mechanism and the change speed gearing of a motor vehicle, a normally engaged rear clutch operable to disconnect the change speed gearing from the propeller shaft of the vehicle during gear shifting operations, and throw-out mechanism therefor, the gearing including a gear shifting lever, of motor means for operating the throw-out mechanism for the main clutch and the rear clutch to disengage said clutches successively, a handle on the gear shifting lever and operable as a unit with the lever to actuate said lever to effect the shifting movement thereof, and operable relatively thereto, and means operated by the relative movement of the handle to the lever to control the operation of the motor means for the front throw-out mechanism, and operable by the shifting movement of the lever to operate the motor means for the rear throw-out mechanism.

2. The combination with a main clutch throw-out mechanism and the change speed gearing of a motor vehicle, a normally engaged rear clutch operable to disconnect the change speed gearing from the propeller shaft of the vehicle during gear shifting operations, and throw-out mechanism for the rear clutch, the gearing including a gear shifting lever, of motor means for operating the throw-out mechanism for the main clutch, and of the rear clutch to disengage said clutches, means for controlling the actuation of said motor means successively including an operating member carried by the gear shifting lever and movable relatively thereto at an angle to the shifting movement of the lever, and as a unit with said lever during the shifting movement, connections operated by the relative movement of said member for controlling the operation of the motor means for the throw-out mechanism of the main clutch, and connections operated by the shifting movement of the lever for controlling the operation of the motor means for the throw-out mechanism for the rear clutch.

3. The combination with a main clutch throw-out mechanism and the change speed gearing of a motor vehicle, a normally engaged rear clutch operable to disconnect the change speed gearing from the propeller shaft of the vehicle during gear shifting operations, the gearing including a gear shifting lever, and throw-out mechanism therefor, power means for controlling the operation of the throw-out mechanisms for the main and the rear clutches, an operating member carried by the gear shifting lever and movable relatively thereto and operable during its relative movement to effect the operation of the motor means which actuates the throw-out mechanism of the main clutch, by its power means, and connections opearted by the shifting movement of the lever to control the operation of the power means for the throw-out mechanism of the rear clutch.

4. The combination with a main clutch throw-out mechanism and the change speed gearing of a motor vehicle, a normally engaged rear clutch operable to disconnect the change speed gearing from the propeller shaft of the vehicle during gear shifting operations, and throw-out mechanism therefor, the gearing including a gear shifting lever, of motor means for operating the throw-out mechanisms for the main clutch and the rear clutch to disengage the same, and means for controlling the successive operation of the motor means including mechanism carried by the gear shifting lever and operable relative to said lever and by the shifting movement of said lever to effect the successive operation of the motor means.

JOSEPH E. PADGETT.